UNITED STATES PATENT OFFICE

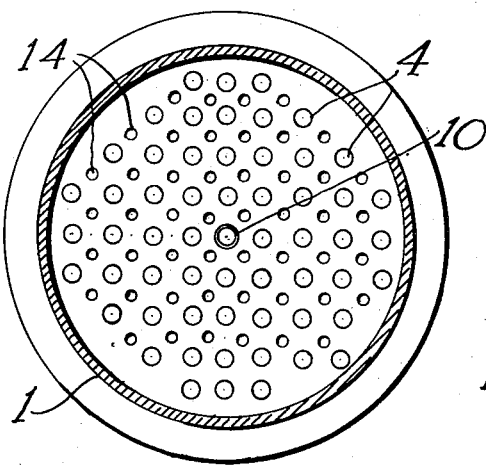
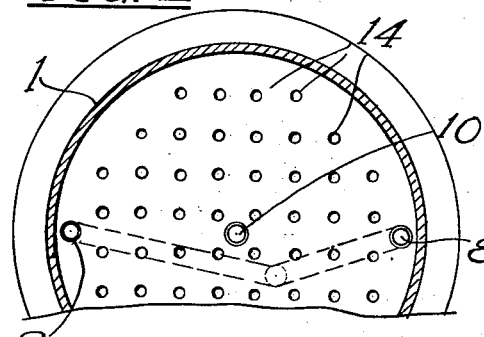
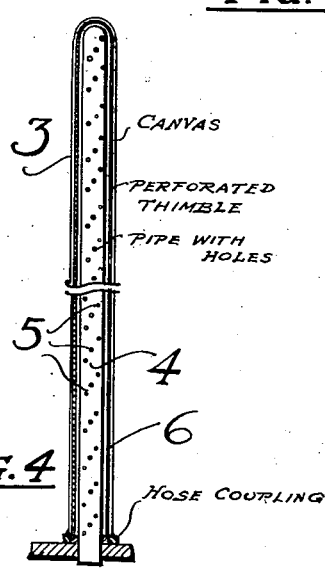
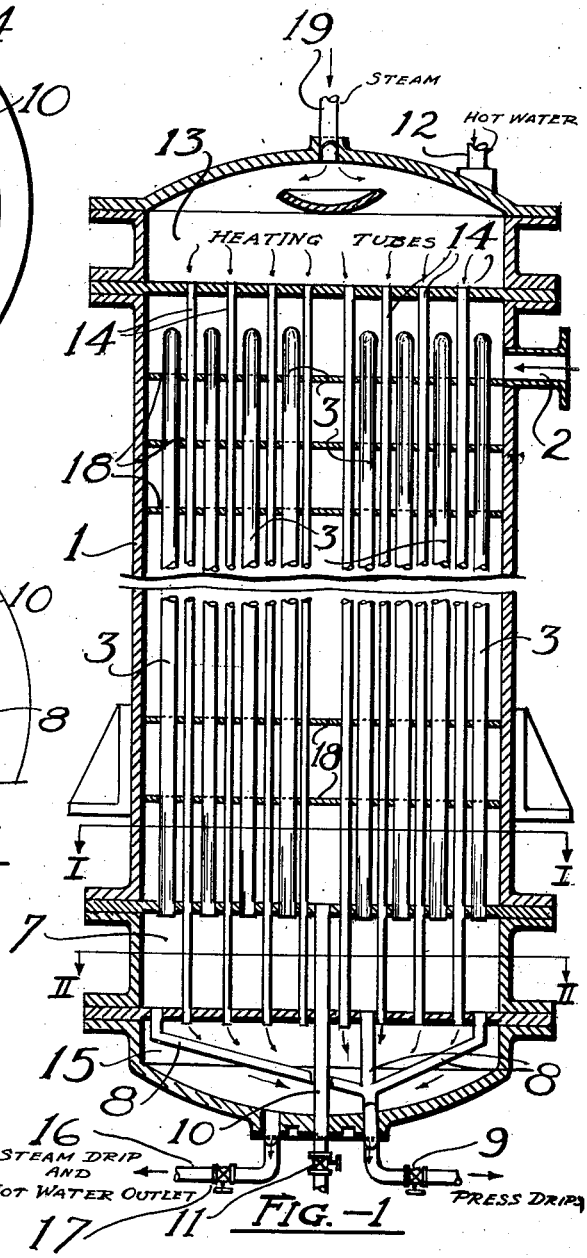

JULES VERNER, OF LINDEN, NEW JERSEY, ASSIGNOR TO STANDARD OIL DEVELOPMENT COMPANY, A CORPORATION OF DELAWARE

METHOD FOR THE SEPARATION OF PARAFFIN FROM PETROLEUM OILS AND APPARATUS THEREFOR

Application filed August 16, 1927. Serial No. 213,244.

This invention relates to a method and apparatus for the separation of paraffin from petroleum oils containing the same and has for its object the more direct and economical separation thereof.

In accordance with my method the oil containing paraffin is chilled to convert the paraffin into the solid form and the resulting suspension of paraffin in oil is then forced into contact with a filtering medium which may be of any finely woven material, although I preferably employ a closely woven grade of canvas. The filtering medium is suitably supported to resist the pressure of the oil and the supporting means is preferably perforate to facilitate the escape of filtrate. A sheet of gauze or perforated metal is preferably interposed between the filtering medium and the support to facilitate flow of filtrate to the perforations. The filtering operation is continued until a layer of solid material has been built up on the filtering medium. This layer consists of a mixture of oil and paraffin and will be hereinafter referred to as slack-wax. I then discontinue the supply of paraffin carrying oil, withdraw any unfiltered excess and apply a mild heat to the slack-wax in situ sufficient to sweat the slack-wax, viz. to produce a separation of oil therefrom. I withdraw the oil as produced and gradually raise the temperature until a relatively pure paraffin is left adhering to the filtering medium, and a final temperature of 100–130° F. may be required for this purpose. At this point I again increase the temperature to melt the paraffin and withdraw the same separately.

The filtering medium may be in the form of a multiplicity of unit surfaces lying in vertical planes or a multiplicity of curved surfaces such as cylinders vertically disposed. A series of spaced horizontal grid-like partitions are preferably provided adjacent the filtering medium to assist in supporting the layer of paraffin thereon. Suitable means for separately withdrawing the filtered oil, the oil separated by sweating and the wax after melting will of course be provided.

Fig. 1 of the drawing shows a diagrammatic vertical cross section of an apparatus for carrying my method into effect. Fig. 2 is a horizontal cross section of Fig. 1 through the plane denoted by the line 1—1. Fig. 3 is a horizontal cross section of Fig. 1 through the plane denoted by the line II—II, and Fig. 4 is a cross section showing details of a part of Fig. 1.

The apparatus and the operation thereof will be conjointly described. Oil carrying paraffin which has been previously chilled to convert the paraffin into solid form is forced under pressure into the casing 1 through inlet 2. This casing is provided with a multiplicity of spaced convas filtering thimbles 3.

As shown more in detail in Fig. 4, thimbles 3 are supported by the tubes 4 containing perforations 5 and separated from said tubes by sleeves of wire gauze or perforated metal 6. The oil passes through the canvas thimbles and flows by means of sleeves 6 until it passes through perforations 5 into the interor of tubes 4 to be discharged into space 7 from which it passes by branched pipe 8 controlled by valve 9 to any suitable accumulator. This is continued until a layer of slack-wax has been formed on the outside of the thimbles 3. The flow of oil and paraffin is then discontinued and any material not adhering to the thimbles is withdrawn through pipe 10 controlled by valve 11. At this point I introduce warm water through the inlet 12 to the chamber 13. This passes downwardly through the multiplicity of heating tubes 14 discharging into chamber 15 and is continuously withdrawn through pipe 16 controlled by valve 17. The chamber 1 is spanned by a series of transverse grid-like partitions 18.

By means of tubes 14 I apply a moderate heat to the slack-wax in situ the degree of heat being controlled to sweat the slack-wax, viz. to produce a partial separation of a liquid phase rich in oil which is continuously withdrawn through pipe 10 leaving behind a layer of purified or semi-purified paraffin adhering to the canvas thimbles. When this operation is complete, the water is withdrawn from the heating tubes 14 and steam is turned in through pipe 19, any condensate being withdrawn through pipe 16. The steam flows through tubes 14 and melts down the paraffin so that it flows freely out of the apparatus through pipe 10. A cooling liquid is then passed in through inlet 12 to circulate through the tubes 14 and cool the apparatus, after which the cycle of operations may be repeated.

It will be understood that the construction shown is in illustration and not in limitation and that my method may be carried out in various forms of apparatus without departing from the invention. Various alternatives may also be made within the scope of the appended claims in which it is my intention to claim broadly all novelty inherent in my invention.

I claim:

1. The method of separating paraffin from petroleum oils containing the same which comprises forcing a mixture of oil carrying suspended paraffin through a combined filtering and sweating zone to form first a filtrate and a layer of slack-wax in said zone, conducting away the filtrate, thereafter applying heat to the slack-wax in situ in the same zone, sufficient to produce a liquid phase and a residuum of paraffin, conducting away the liquid phase and thereafter applying heat sufficient to melt the paraffin and conducting away the melted paraffin.

2. An apparatus for the separation of paraffin from paraffin oils carrying the same in suspension, which comprises a vertical shell with top and bottom closures, an inlet through which paraffin-containing oil to be filtered may be introduced to said shell, a multiplicity of spaced canvas filtering thimbles extending upwardly from openings in said bottom closure, means within said thimbles to support the same and convey the filtrate through said openings, a multiplicity of spaced heating tubes outside of and between said thimbles, means for passing heating media through said heating tubes, an outlet through said bottom closure between said tubes for the withdrawal of products separated by the application of heat.

3. Apparatus according to claim 2 together with a number of spaced horizontal grid-like partitions spanning said shell.

4. An apparatus for the separtion of paraffin from petroleum oil, carrying the same in suspension, which comprises a vertical shell, an inlet through which paraffin containing oil to be filtered may be supplied thereto, a multiplicity of canvas thimbles extending upwardly from said bottom closure, said thimbles being closed at the upper extremity thereof, perforated sleeves immediately beneath said canvas thimbles, foraminous tubes closed at the upper end within said canvas thimbles, said tubes discharging through said bottom closure, a multiplicity of spaced heating tubes extending vertically outside of and between said thimbles, a number of spaced horizontal grid-like partitions spanning said shell intermediate said thimbles and said heating tubes, means for supplying heating media to said heating tubes, and a valved outlet in said bottom closure.

JULES VERNER.